United States Patent [19]

Motoyama

[11] 4,134,145
[45] Jan. 9, 1979

[54] TAPE RECORDER WITH CUE/REVIEW SWITCHING

[75] Inventor: Kazuyasu Motoyama, Hachioji, Japan

[73] Assignee: Olympus Optical Company, Ltd., Tokyo, Japan

[21] Appl. No.: 711,069

[22] Filed: Aug. 2, 1976

[30] Foreign Application Priority Data

Aug. 13, 1975 [JP] Japan .......................... 50/111769[U]
Aug. 14, 1975 [JP] Japan .......................... 50/112165[U]
Sep. 12, 1975 [JP] Japan .......................... 50/126671[U]

[51] Int. Cl.² ........................ G11B 15/04; G11B 15/00
[52] U.S. Cl. ........................................ 360/137; 360/96
[58] Field of Search .................................. 360/93–96, 360/137, 61, 62, 60; 179/100.1 DR

[56] References Cited

U.S. PATENT DOCUMENTS

| Re. 29,049 | 11/1976 | Schoettle | 360/96 |
| 3,913,145 | 10/1975 | Wiig | 360/96 |
| 4,017,900 | 4/1977 | Katsurayana | 360/96 |

OTHER PUBLICATIONS

Sears Fall/Winter Catalog 1975, p. 1110, Ad for Player-Recorder w/Cue & Review, 8/75.
1975 Lafayette Catalog, #750, Ad for Craig 2627.
47th Street Photo Co. - Ad on page 232, for Sony TC-44, TC-92 & others.

*Primary Examiner*—Jay P. Lucas
*Attorney, Agent, or Firm*—Ostrolenk, Faber, Gerb & Soffen

[57] ABSTRACT

A tape recorder comprises an operating device including a tape feed switching member which is provided with an abutment surface adapted for engagement with a playback actuating member to prevent the switching member from being locked in a review position when the playback actuating member is in its playback position, brake means including a braking member responsive to each of a record actuating member, a rapid tape advance actuating member or a tape rewind actuating member for applying a braking action upon a tape supply shaft, and an ejector including a cover opening and cassette ejecting member which is responsive to an operation of a magnetic head carrying member for performing the opening of a cover of a tape cassette receiving chamber and the ejection of a tape cassette therefrom in two steps. The provision of the operating device in the manner mentioned above prevents the tape feed switching member from being locked in a review position when a review operation is desired during a playback operation. The braking means is effective to apply a braking action only upon the tape supply shaft except when the tape is being fed. The ejector permits only the cover of the cassette receiving chamber to be opened during the operation of the tape recorder, and allows the tape cassette to be ejected only when the tape recorder is at rest.

12 Claims, 18 Drawing Figures

F I G. 12
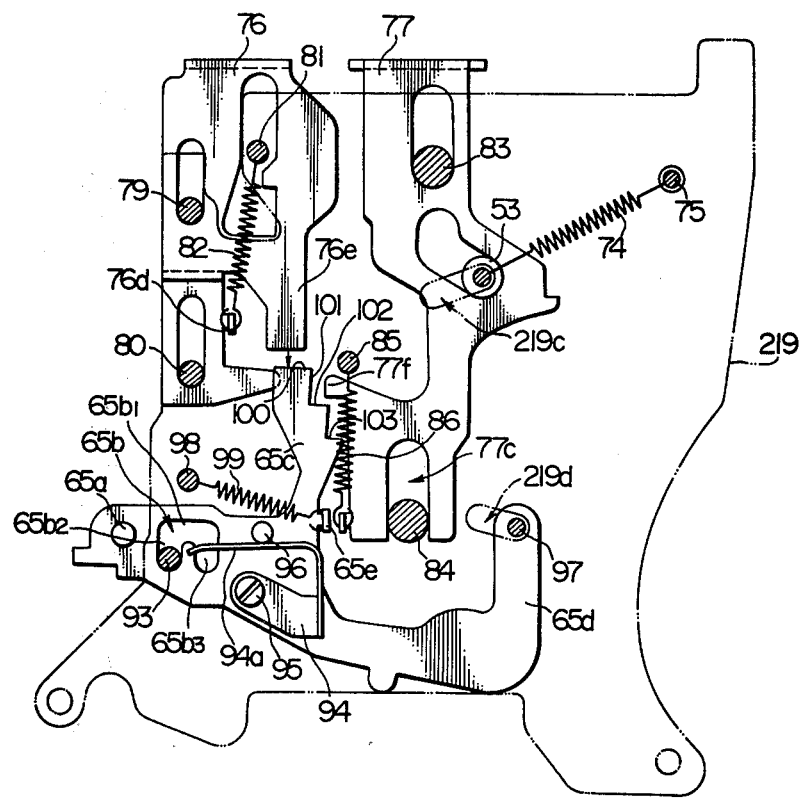
F I G. 13
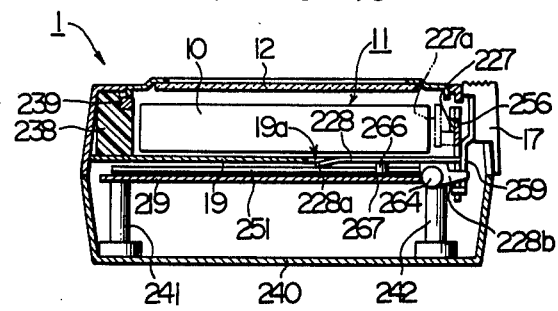

TAPE RECORDER WITH CUE/REVIEW SWITCHING

BACKGROUND OF THE INVENTION

The invention relates to a tape recorder, and more particularly to a tape recorder having improved manoeuverability during the placement or removal of a tape cassette or during the tape running.

As is well recognized, a magnetic tape in a tape recorder is subject to a rapid advance or a rewind, in addition to its feeding at a uniform rate for purposes of recording or playback. The rewind takes place either at the termination of recording a full tape in order to reproduce the record made, or at the termination of a playback operation in order to repeat the same record content. The rewind frequently continues over an increased length of time, so that a tape feed switching lever is usually locked in its rewind position. Additionally, the rewind may also take place for a brief interval during the playback in order to provide a review, namely, a repeated hearing. In this instance, the magnetic head is maintained in abutment against the magnetic tape, and hence may be subject to an increased abrasion if the rewind is permitted to continue over a prolonged period of time by utilizing the rewind lock. It will be thus seen that it is necessary to prevent an operating lever from being locked during a review operation. However, it is extremely difficult to permit the single lever to be locked during a rewind operation and to prevent it from being locked during a review operation. The required arrangement adds to the complexity of the apparatus or otherwise involves an unreliable operation.

A tape supply shaft in a tape recorder is adapted to be rotated during a running of the magnetic tape in following relationship with the running tape. However, if for some reason the tape supply shaft rotates when the magnetic tape is not being fed as might occur when the tape recorder, in particular, a miniature tape recorder, is manually carried about with a tape cassette loaded therein, the tape assumes a slack condition, causing inconveniences.

In a tape recorder of a type having a tape cassette receiving chamber which is either opened or closed by a cover, there is a need for the provision of some means for ejecting the tape cassette, as when an eject button is depressed, by opening the cover and ejecting the cassette. However, if the opening of the cover and the ejection of the cassette are allowed to occur simultaneously, an ejection may be impeded by a racing which may occur between the cover and the cassette. On the other hand, it is essential that an ejection of the tape cassette be inhibited during an operation of the tape recorder when the tape is running since otherwise the tape may be damaged.

SUMMARY OF THE INVENTION

It is an object of the invention to provide a cassette tape recorder of a miniature size which avoids the above inconveniences or difficulties of the prior art by providing a novel arrangement of components and parts which achieves an improved manoeuverability.

It is a specific object of the invention to provide a tape recorder having an operating device including a tape feed switching lever which is provided with an abutment surface adapted to bear against a playback actuating lever to prevent a review lock when the playback actuating lever is set in its playback position.

The tape feed switching lever has an arm which is formed with portions for unlocking the rewind during a record operation, for blocking a tape feed switching, and for unlocking the rewind during a playback operation. In accordance with the invention, the arm of the switching lever is also formed with an abutment surface which inhibits a locking of the rewind during a playback operation, so that an undesirable abrasion of the magnetic head is effectively prevented.

It is another object of the invention to provide a tape recorder having a tape supply shaft braking unit including a braking member which is adapted to apply a braking action upon a tape supply shaft and which is responsive to each of a record actuating member, a rapid tape advance actuating member and a tape rewind actuating member for releasing the tape supply shaft from the braking action, thus allowing the braking action to be applied only when it is required, namely, when the tape is not running, and preventing an inadvertent accident such as a tape jamming.

It is a further object of the invention to provide a tape recorder having a tape cassette ejector which performs the opening of the cover and the ejection of a tape cassette in two steps while enabling only the opening of the cover and automatically inhibiting an ejection of the cassette during the operation of the tape recorder.

BRIEF DESCRIPTION OF THE DRAWINGS

FIG. 12 is a plan view showing interrelationship between a record actuating lever, a playback actuating lever and the tape feed switching lever;

FIG. 13 is a cross section taken along the line XIII—XIII shown in FIG. 1;

DETAILED DESCRIPTION OF PREFERRED EMBODIMENT

Figure 1:
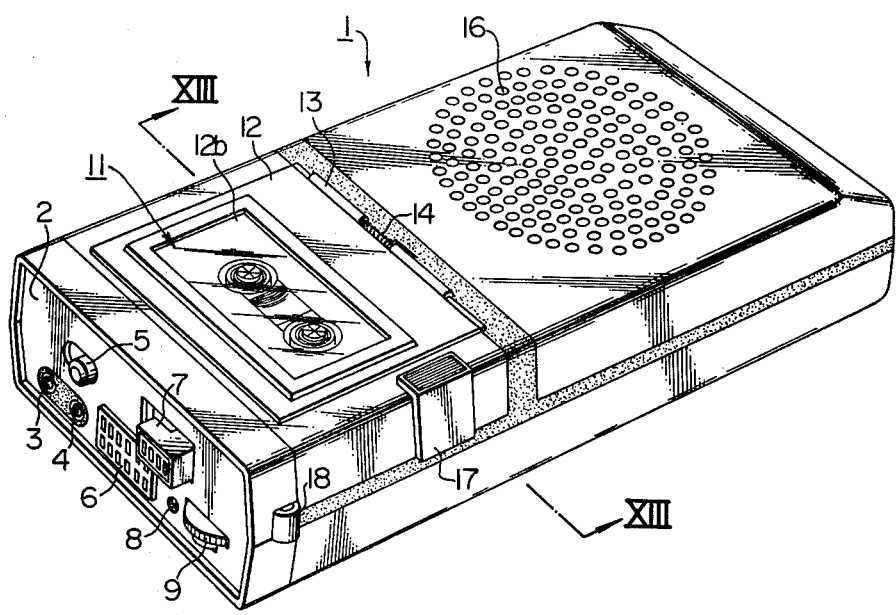
FIG. 1 is a perspective view of a tape recorder constructed in accordance with one embodiment of the invention.
Figure 2:
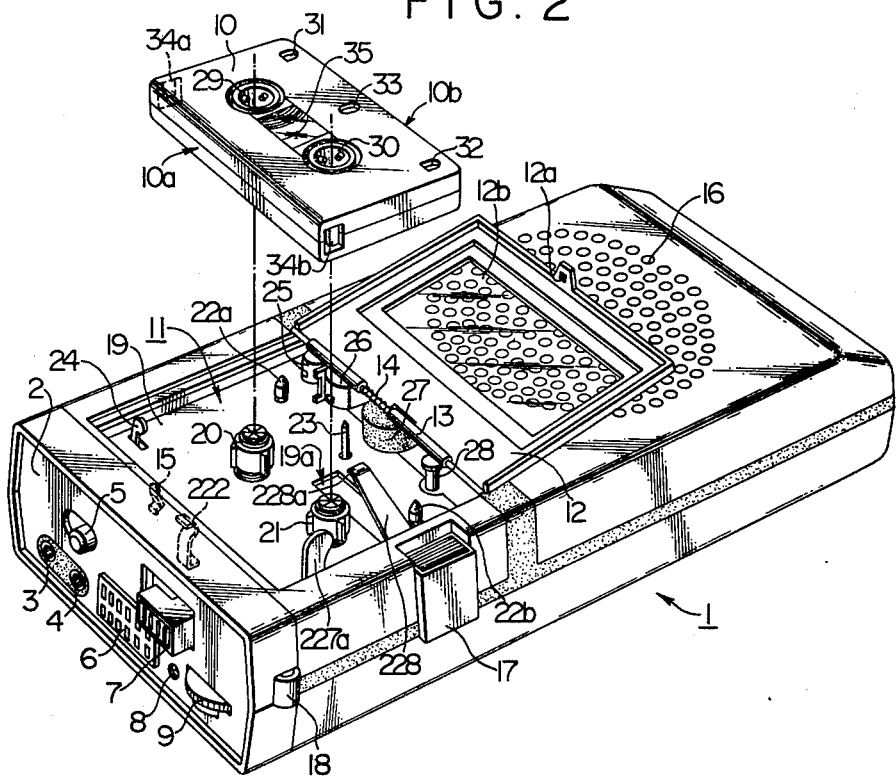
FIG. 2 is a similar perspective view of the tape recorder shown in FIG. 1 when the cover of a cassette receiving chamber is opened and with a tape cassette removed from the chamber.

Referring to FIGS. 1 and 2, there is shown a tape recorder 1 having a panel 2 on its front end face. As viewed from left to right, disposed on the panel 2 are an earphone jack 3, a jack 4 for connection with an external microphone, a pose switch 5, a grille 6 representing an opening for an internally housed microphone, a combined rapid tape advance and rewind button 7, an indicator window 8 effective to indicate that the tape recorder 1 is in its record mode and which also serves as a battery checker, and a volume control 9.

Toward the front end, the upper surface of the tape recorder 1 is formed with a cassette receiving chamber 11 into which a tape cassette 10 (see FIG. 2) is loaded. A cover 12 is associated with the chamber 11 for closing it. The cover 12 is pivotally mounted by a pair of hinges 13 which are located toward the both lateral sides of the recorder 1, and is normally biased by a torsion spring 14 in its opening direction. The free end of the cover 12 is centrally provided with a detent 12a, which is adapted to be engaged with a hook 15 (shown in broken lines in FIG. 2) located on the upper surface of the tape recorder along the edge of the chamber 11. A window 12b is centrally formed in the cover 12 for permitting the interior of the chamber to be viewed therethrough when the cover is closed.

Toward its rear end, the upper surface of the recorder 1 is formed with a grille 16 for an internally housed loudspeaker. An ejection button 17 is disposed in the right-hand sidewall of the recorder 1, as viewed in these Figures, and a sling 18 for attachment of a suspension cord for portable use is also disposed therein toward the front end face.

Figure 14:
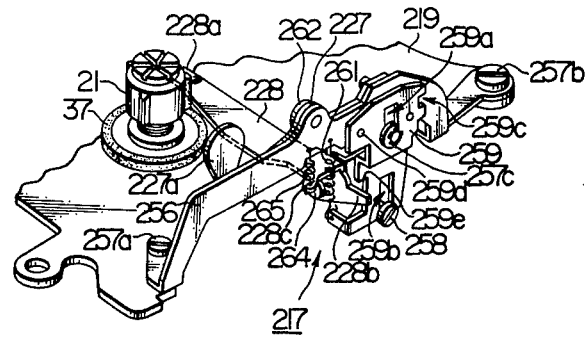
FIG. 14 is a perspective view of an ejector in the tape recorder shown in FIG. 1.

When the cover 2 closes the chamber 11 which contains a tape cassette 10 as shown in FIG. 1, the depression of the eject button 17 causes an ejection device 217, which will be described more fully later with reference to FIG. 14, to be operated, whereby a cover opening member 227 is effective to open the cover 12 with its pushing portion 227a, and an ejecting member 228 is effective to eject the tape cassette 10 with its cassette pushing portion 228a.

As shown in FIG. 2, the chamber 11 is partly defined by a bottom plate 19, through which extend a pair of shafts, i.e., a tape supply shaft 20 and a tape take-up shaft 21, said shafts extend upwardly from below in parallel relationship. A pair of positioning pins 22a, 22b extend through the bottom plate 19 at positions toward the grille 16, and a capstan 23 extends therethrough intermediate the positioning pins. A lug detecting lever 24 extends through the left-hand marginal portion of the bottom plate 19 toward the front end face, the lever extending from below through the bottom plate. The shafts 20, 21, positioning pins 22a, 22b, capstan 23 and lever 24 are disposed either fixedly, rotatably or rockably on a base plate 219 which is located below the bottom plate 19, as will be further described later. Disposed on the bottom plate 19 toward its end adjacent to the loudspeaker grille 16 are an erase head 25, a record/playback head 26, a pinch roller 27 and a tape guide pin 28 in the sequence named from left to right. The manner in which the record/playback head 26 and the pinch roller 27 are supported will be further described later.

As will be appreciated, the tape cassette 10 is formed with a pair of tape hubs 29, 30, a pair of positioning apertures 31, 32 and a capstan aperture 33, which are engaged by the shafts 20, 21, positioning pins 22a, 22b and capstan 23, respectively. In addition, the cassette is provided with a pair of lugs 34a, 34b on its opposite lateral sides and adjacent to its rear surface 10a, these lugs cooperating with the detecting lever 24 for preventing an inadvertent erasure. A length of magnetic tape 35 is disposed on the hubs 29, 30, and extends from one of the hubs to the other while extending along the front end face 10b. When the cassette 10 is loaded into the chamber 11, the tape 35 is passed between the capstan 23 and the pinch roller 27 so as to be located against the head 26. The lug detecting lever 24 cooperates with either lug 34a or 34b on the cassette 10, depending on which surface of the cassette 10 is located upside, and enables a record mode to be established in the tape recorder only when the presence of either lug is detected. At this time, a resilient hook 222 prevents the cassette 10 from being raised upward.

Figure 3:
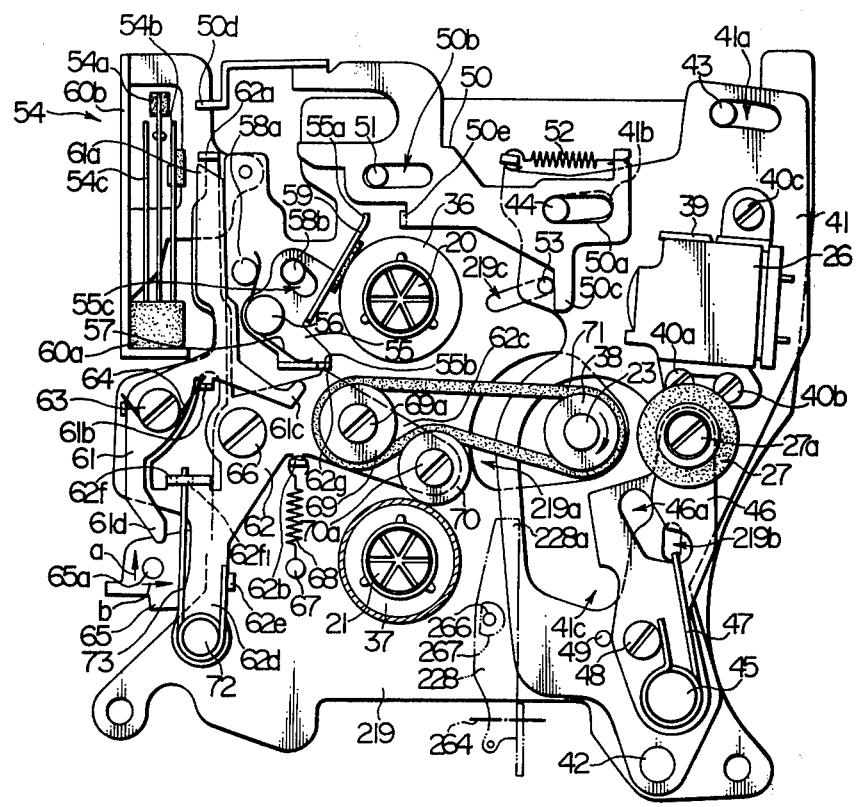
FIG. 3 is a plan view of a tape feed mechanism used in the tape recorder of FIG. 1.

Referring to FIG. 3, the shaft 20 is rotatably mounted on the base plate 219 in an integral manner with a driven wheel 36, and similarly the shaft 21 is rotatably mounted on the base plate integrally with a driven wheel 37. The capstan 23 is integral with a drive pulley 38, and is rotatably mounted on a support plate, not shown, which is integral with the base plate 219. Both the capstan and the drive pulley extend through a slot 219a formed in the base plate, and are operationally connected with a drive source, not shown.

The record/playback head 26 is carried by a mounting member 39 which is fixedly mounted on a head support lever 41 by means of set screws 40a, 40b, 40c. The lever 41 is rotatably mounted on a pin 42, and is urged to rotate clockwise about the pin by a coiled spring 74, as will be described later with reference to FIG. 5. Formed in the free end of the lever 41 are a pair of arcuate slots 41a, 41b both centered about the pin 42 and which are engaged by a pair of pins 43, 44, respectively, fixedly mounted on the base plate 219, thus limiting the extent of movement thereof. The lever 41 is centrally formed with a slot 41c which permits the capstan 23 and the drive pulley 38 to extend freely therethrough.

Adjacent to the pin 42, the lever 41 fixedly carries another pin 45 on which a pinch roller support lever 46 is rotatably mounted. The pinch roller 27 is rotatably mounted on a pin 27a which is secured to the free end of the lever 46. A torsion spring 47 is disposed on the pin 45 and has its one end engaged with a set screw 48 fixed to the lever 46 and its other end extending through a slot 46a formed in the lever 46 and engaged with the right-hand edge, as viewed in FIG. 3, of a slot 219b formed in the base plate 219, thus urging the lever 46 to rotate counter-clockwise about the pin 45. The extent of rotation of the lever 46 is limited by a pin 49 which is fixedly mounted on the head support lever 41.

Figure 4:
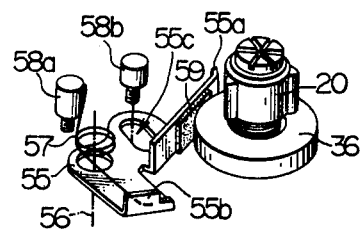
FIG. 4 is a perspective view of a braking unit associated with the tape supply shaft shown in FIG. 3.

A switch actuating lever 50 has a lengthwise elongate slot 50a formed therein which is engaged by the pin 44, and another lengthwise elongate slot 50b which is engaged by a pin 51 fixedly mounted on the base plate 219, thus making the lever 50 slidable in a horizontal direction, that is, to the right or left, as viewed in FIG. 3. A coiled spring 52 has its one end secured to the right-hand end of the lever 50 and its other end secured to the left-hand end of the lever 41, thus urging the lever 50 to move to the left with respect to the lever 41. The resulting movement is limited by the engagement of a pin 53 fixedly mounted on the lever 41 with a detent portion 50c provided on the right-hand portion of the lever 50. On its left-hand free end, the lever 50 carries a switch actuator 50d which is located adjacent to an operating piece 54a of a main switch 54. Intermediate its length, the lever 50 carries a brake release projection 50e, which is located adjacent to the tip of one arm 55a of a braking member 55 (see FIG. 4). The braking member 55 is rotatably mounted on a pin 56 secured to the base plate 219, and a torsion spring 57 disposed on the pin 56 has its one end engaged with a pin 58a fixedly mounted on the base plate 219 and its other end engaged with its another arm 55b, thus urging the member 55 to rotate clockwise about the pin 56. As shown in FIG. 4, the braking member 55 is formed with an elongate slot 55c, into which is fitted a pin 58b fixedly mounted on the base plate 219. The both 55a, 55b of the braking member 55 are bent upwardly from the plane thereof, and a brake shoe 59 of a material such as rubber is fixedly attached to the arm 55a. The brake shoe 59 is held in abutment against the driven wheel 36 which is integral with the tape supply shaft 20, under the resilience of the torsion spring 57.

The main switch 54 comprises another operating piece 54b and a resilient stationary piece 54c as well as the above mentioned operating piece 54a, all of which are mounted on a support 60a, which is in turn secured to the base plate 219 through a mounting member 60b. Located adjacent to the operating piece 54b are pushers 61a, 62a formed on a rapid tape advance actuating lever 61 and a tape rewind actuating lever 62, respectively. The lever 61 is rotatably mounted on a pin 63 secured to the lever 62, and a torsion spring 64 disposed on the pin 63 has its one end secured to the lever 62 and its other end engaged with an upturned tab 61b of the lever 61, thus urging it to rotate clockwise about the pin 63. The pusher 61a bears against the pin 58a. In addition to the pusher 61a, the lever 61 is also formed with a brake release arm 61c extending adjacent to the arm 55b of the braking member 55, and an abutment 61d which is adapted to cooperate with a pin 65a fixedly mounted on a tape feed switching lever 65. As will be described later, the lever 65 is displaceably mounted on the backside of the base plate 219, and fixedly carries the combined rapid tape advance and rewind button 7 (see FIGS. 1, 2 and 6) on its left-hand end. By an external operation, the lever 65 can be displaced in the direction of either arrow a or b. When the lever 65 is displaced in the direction of the arrow a, the pin 65a moves into engagement with the arm 61d to rotate the lever 61 counter-clockwise about the pin 63.

The tape rewind actuating lever 62 is rotatably mounted on a pin 66 fixedly mounted on the base plate 219, and a coiled spring 68 disposed between an upturned portion 62b of the lever and a pin 67 fixedly mounted on the base plate 219 causes the lever to rotate clockwise about the pin 66. In addition to the pusher 62a, the lever 62 is also formed with a pulley support arm 62c and a downwardly extending arm 62d. The pulley support arm 62c fixedly carries a pair of pins 69a, 70a, on which a pair of pulleys 69, 70 are rotatably mounted. An endless belt 71 extends around the pulley 69 and the drive pulley 38 to provide an operational connection therebetween. The pulley 70 engages the outside of the endless belt 71 and is also brought into abutting relationship with the driven wheel 37 on the tape take-up shaft 21 under the resilience of the coiled spring 68. A pin 72 is fixedly mounted on the arm 62d of the lever 62, and torsion spring 73 is disposed on the pin 72 and has its one end engaged with a right-hand upwardly turned portion 62e of the arm 62d and its other end engaged with a slot 62f1 formed as an upwardly turned portion 62f is formed in the base end of the arm 62d. The left-hand limb of the torsion spring 73 is located adjacent to the pin 65a, and the arrangement is such that as the switching lever 65 is operated, the torsion spring 73 initially engages the pin 65a to provide a buffering action so that undue stresses cannot be applied to the lever 62 from the pin 65a. In a region nearer the pin 66 and adjacent to the arm 55b of the braking member 55, the lever 62 is provided with a brake release projection 62g.

Figure 5:
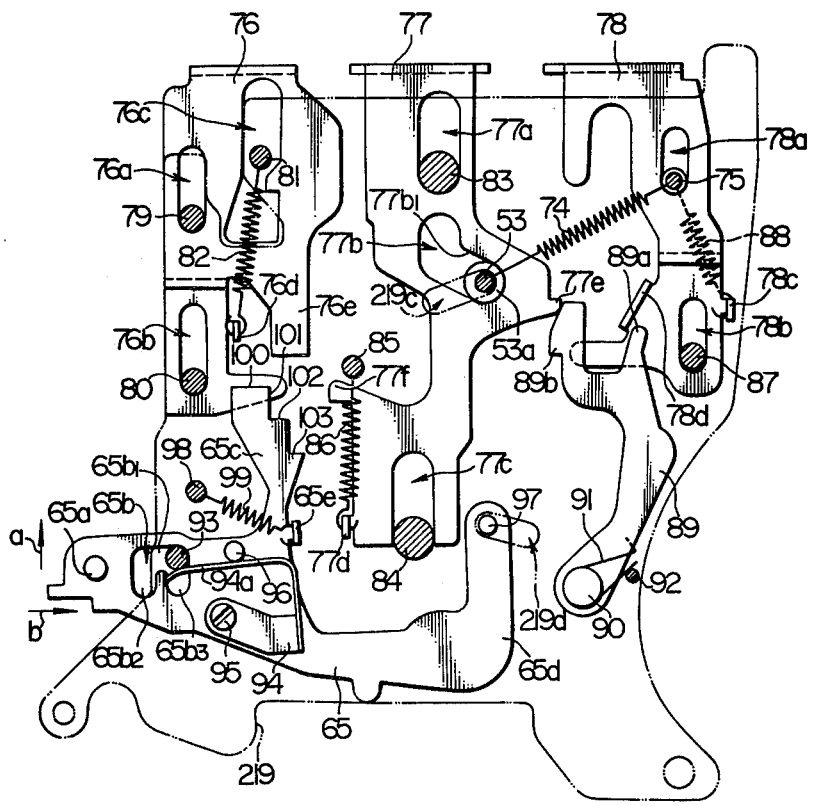
FIG. 5 is a plan view showing various levers in the tape recorder and their interrelationship.

The pin 53 fixedly mounted on the lever 41 extends through an arcuate slot 219c formed in the base plate 219 to the backside thereof, the slot being centered about the pin 42. On the backside of the base plate 219, the pin 53 is engaged by one end of a coiled spring 74, as shown in FIG. 5, the other end of the spring 74 being engaged with a pin 75 which is fixedly mounted on the backside of the base plate 219 in the upper, right-hand portion thereof, as viewed in FIG. 5. In this manner, the lever 41 is urged to rotate clockwise about the pin 42.

Referring to FIG. 5, various components and parts mounted on backside of the base plate 219 will be described below. As viewed in FIG. 5, a record actuating lever 76, a playback actuating lever 77 and a record/playback release lever 78 are disposed in sequence from left to right on the upper portion of the base plate 219. The record actuating lever 76 is formed with a pair of vertically elongate slots 76a, 76b, which are engaged by pins 79, 80 fixedly mounted on the base plate 219 so as to make the lever 76 slidable in the vertical direction. The lever 76 is also formed with a further elongate slot 76c and an upturned tab 76d, and a coiled spring 82 extends between the tab 76d and a pin 81 fixedly mounted on the base plate 219, thus urging the lever 76 to move vertically upward. However, the resulting movement of the lever 76 is limited by the engagement between the pin 79 and the slot 76a. A record button (not shown) is fixed on the upper end of the lever 76.

The playback actuating lever 77 is formed with a vertical elongated slot 77a and an oblique elongated slot 77b in its upper region and is also formed with a forked recess 77c in its lower region, and pins 83, 84 fixedly mounted on the base plate 219 are fitted into the slot 77a and the recess 77c, thus supporting the lever 77 so as to be slidable in the vertical direction. In its left-hand portion, the lever 77 is formed with an upturned tab 77d, which is engaged by one end of a coiled spring 86, the other end of which engages a pin 85 fixedly mounted on the base plate 219. In this manner, the lever 77 is urged to move vertically upward. The pin 53 on the lever 41 which extends through the elongated slot 219c in the base plate 219 has a portion 53a of an increased diameter which fits in the oblique slot 77b and which has its periphery held in the abutment against the right-hand inclined edge 77b1 of the slot 77b under the resilience of a coiled spring 74. A playback button, not shown, is fixed on the upper end of the playback actuating lever 77.

The record/playback release lever 78 is formed with a pair of vertical elongated slots 78a, 78b, which are engaged by the pin 75 and another pin 87, respectively, thus slidably supporting the lever 78 in the vertical direction. On its lower, right-hand portion, the lever 78 is formed with an upturned portion 78c, and a coiled spring 88 is disposed between the portion 78c and the pin 75, thus urging the lever 78 to move upward. A stop button, not shown, is fixed on the upper end of the lever 78.

A detent lever 89 is rotatably mounted on a pin 90 fixedly mounted on the base plate 219 at a position beneath the record/playback release lever 78. A torsion spring 91 is disposed on the pin 90 and has its one end engaged with a pin 92 fixedly mounted on the base plate 219 and its other end engaged with the right-hand edge of the lever 89, thus urging it to rotate counter-clockwise about the pin 90. At its free end, the lever 89 is formed with a projection 89a and a detent projection 89b, which are shaped in the form of a fork, and the projection 89a is located adjacent to a tab 78d upturned from the lower, left-hand portion of the record/-playback release lever 78. The tip of the detent projection 89b is maintained in abutment against an ear 77e formed on the central, right-hand portion of the playback actuating lever 77 under the resilience of a torsion spring 91.

Figure 6:
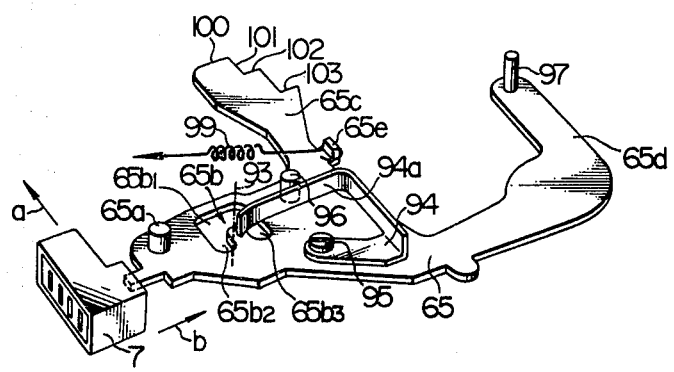
FIG. 6 is a perspective view of a tape feed switching lever in the tape recorder of FIG. 1.

Referring to FIG. 6, the tape feed switching lever 65 is shown as formed with an elongate slot 65b in its body portion and with a pair of arms 65c, 65d extending from the central portion and the right-hand end thereof. The slot 65b is U-shaped having a slot portion 65b1 and a pair of downwardly extending slot portions 65b2, 65b3 which extend from the opposite ends of the slot portion 65b1. A pin 93 fixedly mounted on the base plate 219 fits in the slot 65b. A leaf spring 94 has its one end secured to the underside of the body portion of the lever 65 by a set screw 95 and includes a portion 94a which is folded to bear against a pin 96 fixedly mounted on the lever 65, with its free end closing the slot portion 65b3 so as to prevent the pin 93 from being located within this slot portion 65b3. A pin 97 is fixedly mounted on the free end of the arm 65d, and fits in a slot 219d (see FIG. 5) formed in the base plate 219 and which is elongated in the horizontal direction. By engaging the pin 93 with the slot 65b and engaging the pin 97 with the slot 219d, the tape feed switching lever 65 is slidable in the horizontal direction or in a direction indicated by an arrow b and is also rotatable in the direction of an arrow a about the pin 97. The lever 65 is urged to move to the left by a coiled spring 99 extending between a tab 65e upturned from the proximal end of the arm 65c and a pin 98 fixedly mounted on the base plate 219, and is also urged to rotate counter-clockwise about the pin 97 by the combination of the coiled spring 99 and the leaf spring 94. Consequently, in the absence of an external operation as shown in FIG. 5, the pin 97 bears against the left-hand edge of the slot 219d while the pin 93 bears against the upper, right-hand edge of the slot 65b.

As shown in FIG. 6, the arm 65c is formed with three saw-toothed recesses, thus forming a surface 100 which serves unlocking the rewind during a record operation, a surface 101 for preventing a tape feed switching, a surface 102 for unlocking the rewind during a playback operation and a surface 103 for inhibiting the lock of the rewind, in the sequence proceeding from the tip end of the arm 65c. The surfaces 100 and 101 are located opposite to an abutment 76e formed on the lower, right-hand portion of the record actuating lever 76, and the surfaces 102 and 103 are located opposite to a pusher projection 77f formed on the lower, left-hand portion of the playback actuating lever 77.

The operation of various members in the above described tape recorder 1 will now be described. In FIGS. 3 and 5, the various parts are shown when the tape recorder 1 is inoperative. At this time, neither record actuating lever 76 nor playback actuating lever 77 is depressed; the head support lever 41 is in its inoperative position into which it has rotated clockwise about the pin 42; and the pinch roller 27 is removed from the capstan 23 and the record/playback head 26 is also in its inoperative position. The rapid tape advance and rewind button 7 is not operated, so that the tape feed switching lever 65 also assumes its inoperative position. The main switch 54 remains open, and the drive source for the capstan 23 is not energized. Under this condition, the driven wheel 36 on the tape supply shaft 20 is engaged by the brake shoe 59 of the braking member 55, whereby it is constrained against rotation. As a consequence, when the tape cassette 10 is loaded, no tape feeding takes place. Since the tape supply shaft 20 cannot rotate, the tape hub 29 does not rotate, preventing a slack in the magnetic tape 35.

Figure 8:
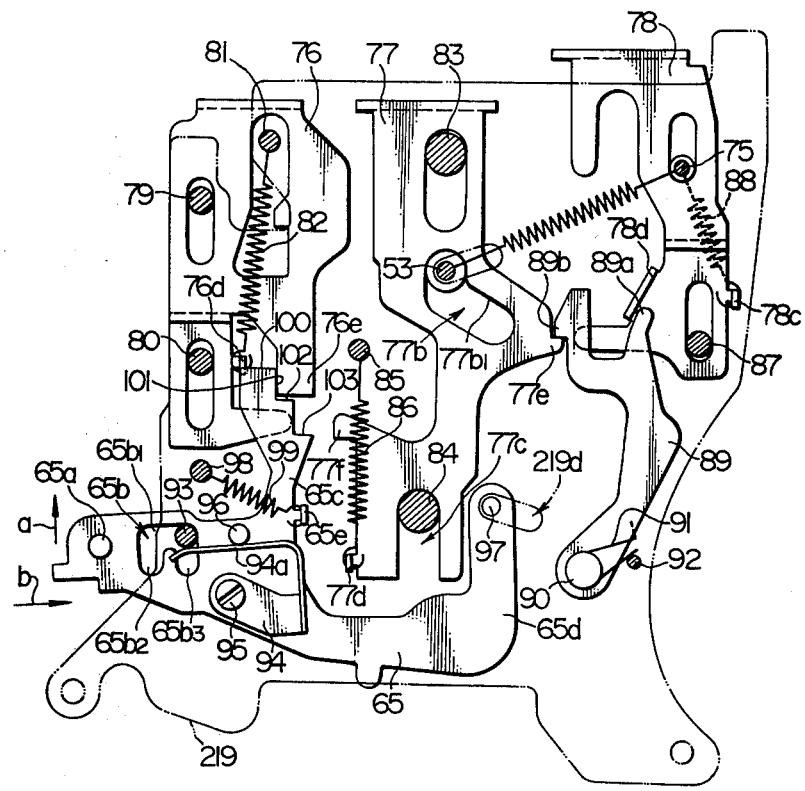
FIG. 8 is a plan view, illustrating the operation of various levers shown in FIG. 5.

When the record actuating lever 76 and the playback actuating lever 77 are operated, they are moved to their positions shown in FIG. 8 where the lever 76 is locked by detent means, not shown, and the lever 77 is locked by the engagement between the tab 77e and the detent projection 89b of the detent lever 89. As the inclined edge 77b1 of the slot 77b in the playback actuating lever 77 urges the large diameter portion 53a of the pin 53, the latter is displaced to the left within the slot 219c in the base plate 219, whereby the head support lever 41 rotates counter-clockwise about the pin 42 to move the record/playback head 26 onto the path of the magnetic tape 35, and the pinch roller 27 is brought into abutting engagement with the capstan 23. As the lever 41 is displaced, the switch actuating lever 50 (see FIG. 3) moves to the left, causing the switch actuator 50d to press the operating piece 54a into abutment against the stationary piece 54c, thus closing the main switch 54. Thereupon, the circuits for the drive source of the capstan 23 and for the record/playback head 26 are closed. The brake release projection 50e on the lever 50 pushes the arm 55a of the braking member 55, which is therefore caused to rotate counter-clockwise about the pin 56, thus releasing the driven wheel 36 on the tape supply shaft 20 from the brake shoe 59.

Figure 7:
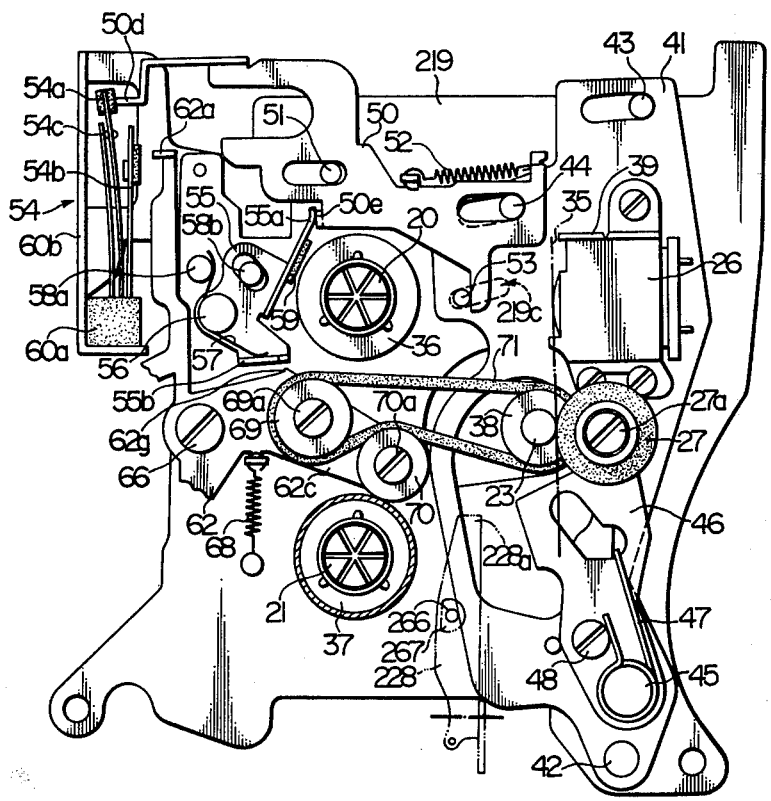
FIG. 7 is a similar view to FIG. 6, illustrating the operation of the tape feed mechanism shown in FIG. 3.

The resulting condition is shown in FIG. 7 where it will be noted that the magnetic tape 35 is held between the capstan 23 and the pinch roller 27 and is fed at a uniform rate from one of the tape hubs, 29 (see FIG. 2), to the other tape hub 30. In the course of such movement, it cooperates with the record/playback head 26 to perform a record or playback operation. The rotation of the capstan 23 is transmitted through drive pulley 38, endless belt 71, pulleys 69, 70 and drive wheel 37 to the tape take-up shaft 21, thus driving the tape hub 30 to take up the magnetic tape 35 as it is being fed.

Upon completion of the intended operation upon the magnetic tape 35, the record/playback release lever 78 may be depressed, whereby the abutment 78d pushes the projection 89a of the detent lever 89 to cause it to rotate clockwise, thus releasing the playback actuating member 77. Thereupon, the lever 77 returns to its initial position together with the record actuating lever 76, the various parts returning from the positions shown in FIGS. 7 and 8 to the positions shown in FIGS. 3 and 5. The entire operation is now terminated, the braking member 55 again constraining the tape supply shaft 20 against rotation. The described operation takes place in a similar manner when the opposite surface of the tape cassette 10 is located upside down. In this instance, the tape hub 79 serves taking up the tape while the tape hub 30 serves to supply the tape.

When the combined rapid tape advance and rewind button 7 (see FIGS. 2 and 6) is operated in the inoperative condition of the tape recorder 1 to rotate the tape feed switching lever 65 about the pin 97 in the direction of the arrow a (see FIG. 5) so that the pin 65a pushes the projection 61d of the rapid tape advance actuating lever 61 (see FIG. 3) to rotate it counter-clockwise about the pin 63, the pusher 61a of the lever 61 presses against the operating piece 54b of the main switch 54, and the brake release arm 61c thereof presses against the arm 55b of the braking member 55. At this time, the pin 93 is located into the slot portion 65b3 of the slot 65b against the resilience of the leaf spring 94. Thereupon, the main switch 54 assumes a position shown in FIG. 9 in which all of the operating pieces 54b, 54a and the stationary piece 54c are in abutting relationship with each other, and the resulting circuit connection (not shown) causes the drive source for the capstan 23 to be rotated at a rapid rate. This enables a rapid feed of the tape 35. When such operation is performed during a playback operation, a cueing results. Since the braking member 55 is urged by the arm 61c of the lever 61 to rotate counter-clockwise about the pin 56, it moves the brake shoe 59 away from the driven wheel 36 on the tape supply shaft 20, which then becomes freely rotatable.

Figure 9:
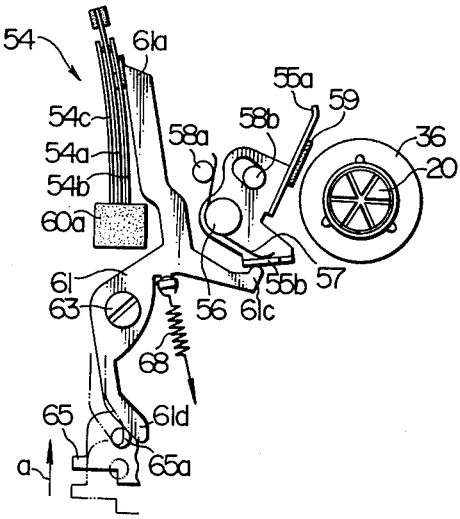
FIG. 9 is a fragmentary plan view, illustrating the operation of a rapid tape advance actuating lever.
Figure 10:
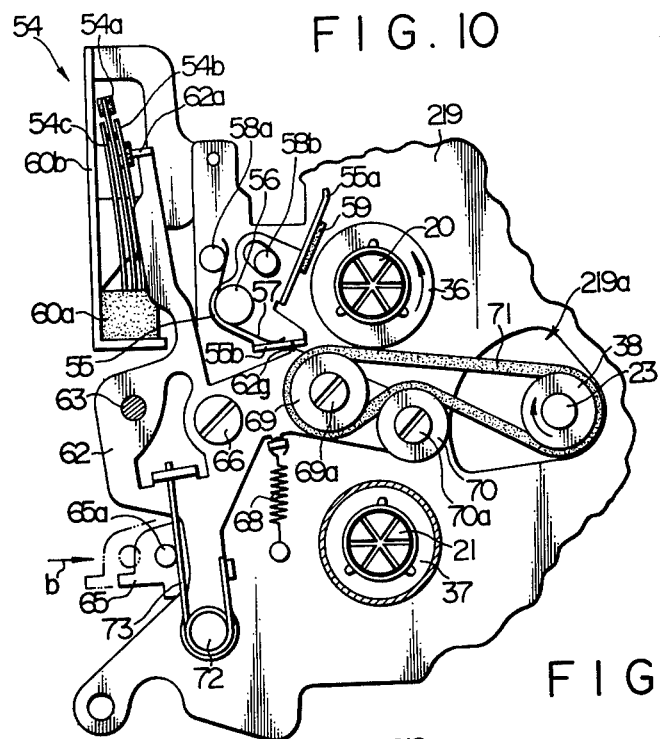
FIG. 10 is a fragmentary plan view, illustrating the operation of a tape rewind actuating lever.

The rapid tape advance is terminated when the tape feed switching lever 65 is freed from the force acting in the direction of the arrow a and allowed to return, under the resilience of the leaf spring 94, from the position shown in FIG. 9 to the position shown in FIGS. 3 and 5 and when the rapid tape advance actuating lever 61 is allowed to return similarly under the resilience of the torsion spring 64. When the positions shown in FIGS. 3 and 5 are reached, the various members resume their inoperative condition, and the tape supply shaft 20 is again braked by the braking member 55.

When the combined rapid tape advance and rewind button 7 is depressed under the inoperative condition shown in FIGS. 3 and 5 to move the tape feed switching lever 65 in the direction of the arrow b, so that the pin 65a presses through the torsion spring 73 against the tape rewind actuating lever 62, the lever 62 rotates counter-clockwise about the pin 66, moving the pulley 70 away from the driven wheel 37 on the tape take-up shaft 21 and bringing the endless belt 71 in its place into abutting engagement with the driven wheel 36 on the tape supply shaft 20. The pusher 62a pushes the operating piece 54b, bringing all of the pieces 54a, 54b, 54c into abutting relationship with each other. The arm 55b of the braking member 55 is pressed by the brake release projection 62g on the lever 62, thus moving the brake shoe 59 away from the driven wheel 36 on the tape supply shaft 20. As a consequence, the tape supply shaft 20 is permitted to rotate in a tape rewind direction at a higher rate, thereby rewinding the tape 35 in a direction toward the tape hub 29. In this instance, the pin 93 is located against the left-hand end of the slot portion 65b1 of the slot 65b.

When the button 7 is released under this condition, the lever 65 returns to its initial position under the resilience of the coiled spring 99, thus releasing the tape rewind. However, when the button 7 is depressed in the direction of the arrow b and then moved in the direction of the arrow a so as to rotate the lever 65 clockwise about the pin 97 after it has been moved inward, the pin 93 will be situated in the slot portion 65b2, whereby the lever 65 is locked in its position shown in FIG. 12 by the pin 93, thus locking a tape rewind. Consequently, if the button 7 is released, the tape rewind automatically continues.

Figure 11:
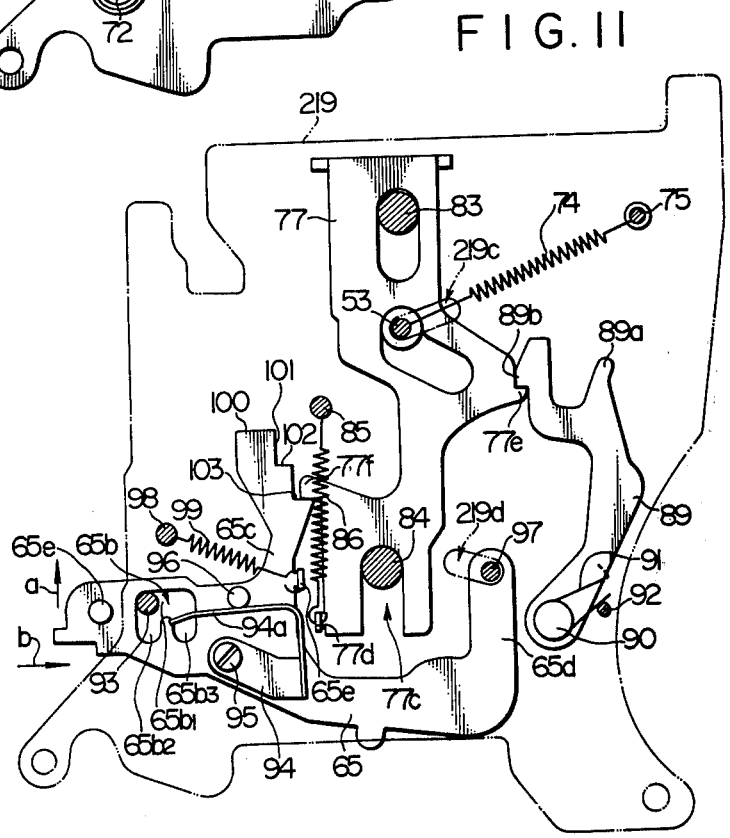
FIG. 11 is a fragmentary plan view, illustrating the operation of the tape feed switching lever as it is operated to rewind a tape.

On the other hand, when the button 7 is only depressed in the direction of the arrow b during a tape playback operation, the tape feed switching lever 65 and the tape rewind actuating lever 62 become operative, performing a review operation (see FIG. 11). Since at this time, the pusher projection 77f on the playback actuating lever 77 bears against the abutment surface 103, the rotation of the lever 65 in the direction of the arrow a is blocked, thus inhibiting locking of the tape rewind or a review lock. In this manner, the degree of contact between the tape 35 and the head 26 which exceeds the necessary contact is avoided.

FIG. 12 illustrates a lock of the tape rewind. When either record actuating lever 76 or playback actuating lever 77 is depressed under this condition, either surface 100 or 102 on the tape feed switching lever 65 is pushed by the corresponding abutment 76e on the lever 76 or the pusher projection 77f of the lever 77, whereby the lever 65 is unlocked and returns from the position shown in FIG. 12 to the position shown in FIG. 5 under the resilience of the coiled spring 99, thus automatically releasing the rewind lock.

When the record mode is established as illustrated in FIG. 7, the tape feed switching lever 65 has its surface 101 maintained in abutment against the left-hand edge of the abutment 76e on the record actuating lever 76 and has its surface 102 located opposite to the abutment 76e, so that an operation of the lever 76 is constrained in order to prevent either rapid tape advance or tape rewind from being performed.

A sideplate 238 is fixedly mounted on the bottom plate 19 along the left-hand side of the cassette receiving chamber 11, as shown in FIG. 13, and a cushion 239 of a material such as polyurethane foam is placed on top of the sideplate 238 for receiving the lateral edge of the cover 12. A similar construction is made on the right-hand side of the cassette receiving chamber 11, though not shown.

It should be noted that the braking member 55 may directly apply a braking action upon the tape supply shaft 20 rather than upon the driven wheel 36, or may indirectly brake other related parts.

Figure 15:
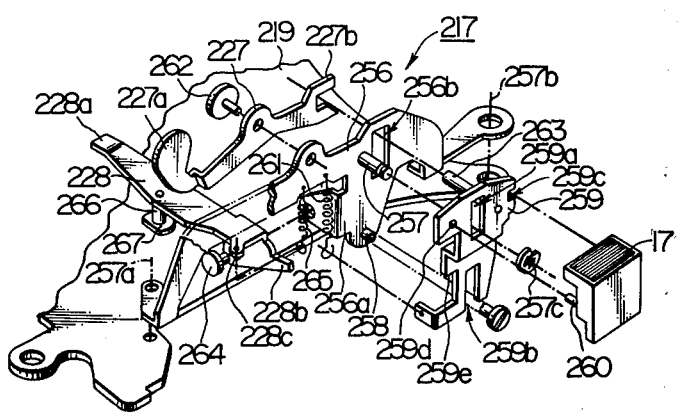
FIG. 15 is an exploded, perspective view showing the apparatus of FIG. 14 in more detail.

Referring to FIG. 13, the ejector will be described. In FIG. 13, the tape recorder 1 is shown as including a lower casing 240 on which a pair of posts 241, 242 are fixedly mounted. The base plate 219 is fixedly supported by these posts as well as other posts, not shown. As shown in FIGS. 14 and 15, a support member 256 has it opposite ends secured to the right-hand portion of the base plate 219 by means of set screws 257a, 257b. The support member 256 is centrally provided with a downwardly depending portion 256a (see FIG. 15) on which a support pin 257 and a guide stud 258 are fixedly mounted in the upper and lower portions thereof. As shown in FIG. 15, the support pin 257 and the guide stud 258 fit in an elongate slot 259a and a notch 259b, respectively, which are formed centrally in an eject button mounting member 259, both of the slot 259a and the notch 259b extending vertically. In this manner, the mounting member 259 is mounted on the support member 256 so as to be slidable in the vertical direction, and an E-ring 257c fitted on the tip end of the support pin 257 provides a locking function. A notch 259c is formed in the upper, right-hand edge of the mounting member 259 while a hole 259d is formed in the upper, left-hand portion thereof. As indicated in FIG. 15, the eject button 17 is secured to the mounting member 259 by engaging its right-hand portion with the notch 250c and fitting a pin 260, fixedly mounted on the left-hand portion thereof, into the hole 259d, with the pin being subsequently crimped. The lower, left-hand portion of the mounting member 259 has its free end bent in a direction toward the support member 256, and a coiled spring 261 is disposed between this free end and the support member 256, thus urging the mounting member 259 to move upward.

As shown in FIG. 15, the cover opening member 227 is rockably mounted on a pin 262 which is mounted on the upper, central portion of the support member 256. The cover opening member 227 has an arm which carries the abutment 227a mentioned above, and also has another arm which is provided with a fork 227b. The fork 227b is engaged by a pin 263 fixedly mounted on the right-hand portion of the mounting member 259 and which extends through an opening 256b (see FIG. 15) formed in the right-hand portion of the support member 256.

Referring to FIG. 15, the left-hand end portion of the downwardly depending portion 256a of the support member 256 is bent at right angles to the plane of the remainder of the support member, and carries a pin 264 on which the ejecting member 228 is rockably mounted. On its left-hand end, the ejecting member 228 carries the cassette pusher 228a mentioned above, and its right-hand end is formed as an abutment 228b, below which is disposed a pusher 259e formed on the left-hand portion of the mounting member 259. A coiled spring 265 extends between the support member 256 and a folded end 228c formed on the upper portion of the abutment 228b, urging the ejecting member 65 to rotate counter-clockwise about the pin 64. An arm portion of the ejecting member 228 which is located nearer the cassette pusher 228a is centrally formed with a downwardly extending stanchion 266 (see FIG. 15), to the lower end of which is secured a plate-like locking member 267.

The locking member 267 is arranged to be locked by the head support lever 41, so that it is freed from the lever 41 to permit a free ejecting operation by the ejecting member 228 when the lever 41 moves clockwise about the pin 42 to place the head 26 and the pinch roller 27 in their inoperative positions. However, when the tape cassette 10 is loaded into the cassette receiving member 11 and either record or playback actuating member is operated to move the lever 41 counterclockwise about the pin 42 so as to bring the head 26 and the pinch roller 27 to their operative positions shown in FIG. 7, the lever 41 moves to a position over the locking member 267, thus locking it. Under this condition, an upward movement of the ejecting member 228 is fully inhibited.

When the operation of the tape recorder 1 terminates subsequently, the lever 41 is returned from the operative position of FIG. 7 to the inoperative position of FIG. 3. When the eject button 17 is then depressed, an ejection of the tape cassette 10 takes place. The operation which takes place in response to the depression of eject button 17 is illustrated in FIGS. 16 to 18.

Figure 16:
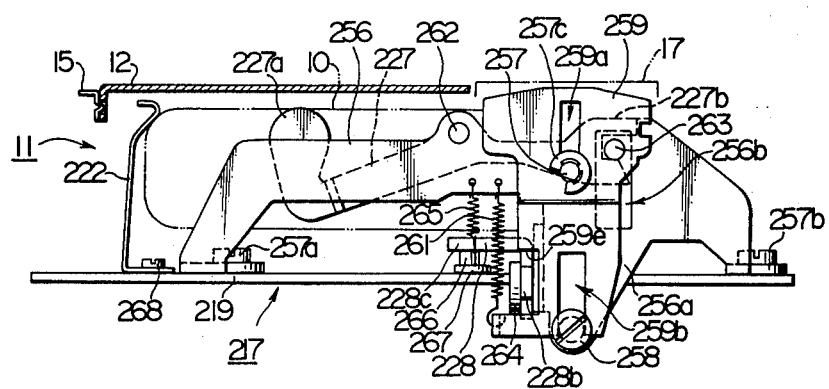
FIGS. 16 to 18 are side elevations, showing the operation of the ejector in the tape recorder of the invention.
Figure 17:
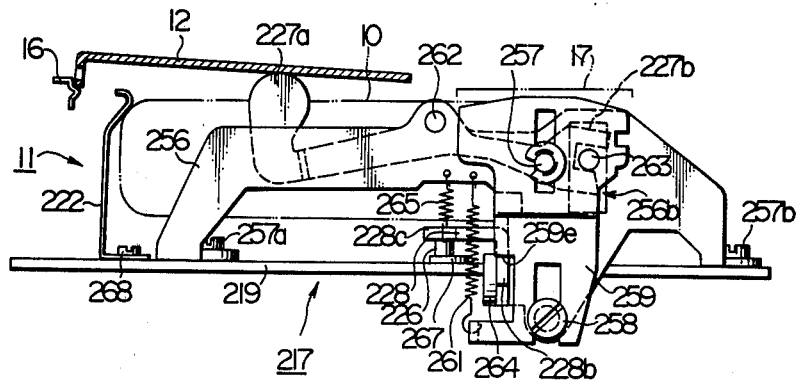

In FIG. 16, various parts are shown in their positions before the eject button 17 is depressed. As shown in FIG. 1, tape cassette 10 received in the chamber 11 is held in place by the detent member 222 (see FIG. 2), and the cover 12 is held closed by engagement with the hook 15. The detent member 222 is secured to the base plate 219 by means of screw 268. In FIGS. 16 to 18, the bottom plate 19 is omitted for clarity of illustration.

When the eject button 17 is depressed, its mounting member 259 moves down against the resilience of the coiled spring 261, with the pin 263 thereon pushing down the fork 227b of the cover opening member 227. Thereupon, the member 227 rotates clockwise about the support pin 262, causing the side of the cover 12 to be pushed up or raised with its pusher 227 to disengage the detent 12a thereof from the hook 15 with a relatively strong sliding action, as illustrated in FIG. 17. When the detent 12a is disengaged from the hook 15, the cover 12 opens automatically under the resilience of the spring 14 (FIGS. 1 and 2).

Figure 18:
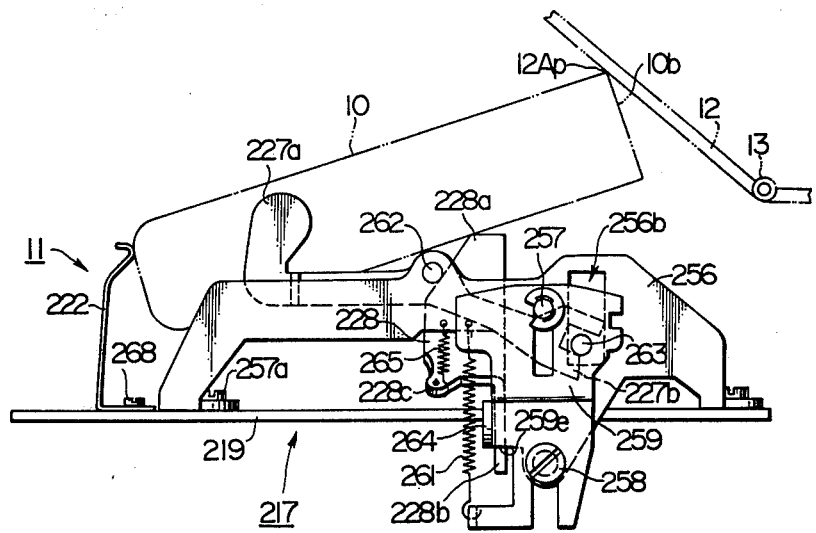

After the cover 12 is initially opened, a further depression of the eject button 17 causes the pusher 259e on the mounting member 259 to move down the abutment 228b of the ejecting member 228, which therefore rotates about the pin 264 against the resilience of the coiled spring 265, raising the cassette pusher 228a as shown in FIG. 18. When the cassette pusher 228a is raised, the tape cassette 10 is disengaged from the detent member 222, and its forward portion will be raised as illustrated in FIG. 18. Thus, an operator can freely take the tape cassette 10 out of the tape recorder 1. Upon termination of the ejection operation, release of the eject button 17 permits all of the members to be returned to their positions shown in FIG. 16 so as to be ready to receive another tape cassette. If the eject button 17 is depressed during the operation of the tape recorder 1, the cover 12 opens, but the ejecting member 228 cannot operate because the locking member 267 is locked by the lever 41 (see FIG. 7). As a consequence, a further depression of the eject button 17 for the purpose of ejection is impossible, preventing an ejection of the tape cassette 10.

In the apparatus of the invention, if the spring 14 has a relatively weak resilience, the cover 12 cannot open automatically by overcoming its own gravity when the cover 12 is raised by the pusher 227a on the cover opening member 227, but the detent 12a is merely disengaged from the hook 15. Subsequently when the tape cassette 10 is ejected as shown in FIG. 18 so that cover 12 is pushed up by the upper edge of the front end face 10b thereof, the gravity of the cover 12 no longer opposes the resilience of the spring 14, whereby the latter is effective to open the cover 12 automatically. This serves to prevent the tape cassette 10 from bouncing out of the chamber during its ejection. Stated differently, if the cover 12 is fully open when the ejection is initiated, such bouncing cannot be prevented. However, if the cover 12 lies in the path of its movement, the cover 12 effectively prevents the bouncing out of the cassette. In this regard, it will be seen that a location 12Ab on the cover 12 which is engaged by the upper edge of the front end face 10b of the tape cassette 10 upon ejection, is advantageously located nearer the hinge 13 than the central portion in order to increase the opening angle of the cover 12 and to reduce the influence upon the spring 14 of the gravity of the cover 12. In addition, an inexpensive spring having a reduced resilience may be used for the spring 14.

What is claimed is:

1. A tape recorder comprising:
  (A) a record actuating lever movable between a nonoperative position and an operative position which places said recorder in a record mode;

(B) a playback actuating lever movable between a non-operative and an operative position which places said recorder in a playback mode;
(C) a tape feedback switch movable between a non-operative position and:
  (1) a first operative position which places said recorder in a fast forward mode;
  (2) a second operative position which places said recorder in a non-locked rewind mode; and
  (3) a third operative position which places said recorder in a locked rewind mode;
(D) means for moving said tape feedback switch out of its third operative position into its non-operative position responsive to movement of said record actuating lever into its operative position and also responsive to movement of said playback actuating lever into its operative position.

2. A tape recorder, comprising:
(A) a record actuating lever movable between a non-operative position and an operative position which places said recorder in a record mode;
(B) a playback actuating lever movable between a non-operative position and an operative position which places said recorder in a playback mode;
(C) a tape feedback switch movable between a non-operative position and:
  (1) a first operative position which places said recorder in a fast forward mode;
  (2) a second operative position which places said recorder in a non-locked rewind mode; and
  (3) a third operative position which places said recorder in a locked rewind mode;
(D) means for preventing said tape feedback switch from being placed in its third operative position when said playback actuating lever is in its operative position.

3. A tape recorder comprising:
(A) a record actuating lever movable between a non-operative position and an operative position which places said recorder in a record mode;
(B) a playback actuating lever movable between a non-operative position and an operative position which places said recorder in a playback mode;
(C) a tape feedback switch movable between a non-operative position and;
  (1) a first operative position which places said recorder in a fast forward mode;
  (2) a second operative position which places said recorder in a non-locked rewind mode; and
  (3) a third operative position which places said recorder in a locked rewind mode;
(D) means for preventing said tape feedback switch from being placed in any of its operative positions when said record actuating lever is in its operative position.

4. A tape recorder, comprising:
(A) a record actuating lever movable between a non-operative position and an operative position which places said recorder in a playback mode;
(B) a playback actuating lever movable between a non-operative position and an operative position which places said recorder in a playback mode;
(C) a tape feedback switch movable between a non-operative position and:
  (1) a first operative position which places said recorder in a fast forward mode;
  (2) a second operative position which places said recorder in a non-locked rewind mode; and
  (3) a third operative position which places said recorder in a locked rewind mode;
(D) means for moving said tape feedback switch out of its third operative position into its non-operative position responsive to movement of said record actuating lever into its operative position and also responsive to movement of said playback actuating lever into its operative position;
(E) means for preventing said tape feed switch from being placed in any of its operative positions when said record actuating lever is in its operative position; and
(F) means for preventing said tape feedback switch from being placed in its third operative position when said playback actuating lever is in its operative position.

5. A tape recorder comprising:
(A) a record actuating lever movable between a non-operative position and an operative position which places said recorder in a record mode;
(B) a playback actuating lever movable between a non-operative and an operative position which places said recorder in a playback mode;
(C) a tape feed switch movable between a non-operative position and:
  (1) a first operative position which places said recorder in a fast forward mode;
  (2) a second operative position which places said recorder in a non-locked rewind mode; and
  (3) a third operative position which places said recorder in a locked rewind mode;
(D) means for moving said tape feedback switch out of its third operative position into its non-operative position responsive to movement of said record actuating lever into its operative position and also responsive to movement of said playback actuating lever into its operative position, said means comprising:
  (1) a first surface formed in said tape feedback switch, the location and shape of said first surface being arranged that said record actuating lever contacts said first surface and urges said tape feed switch out of its third operative position when said record actuating lever is moved into its operative position; and
  (2) a second surface formed in said tape feed switch, the location and shape of said second surface being arranged such that said playback actuating lever contacts said second surface and urges said tape feedback switch out of its third position when said playback actuating lever is moved into its operative position.

6. A tape recorder, comprising:
(A) a record actuating lever movable between a non-operative position and an operative position which places said recorder in a record mode;
(B) a playback actuating lever movable between a non-operative position and an operative position which places said recorder in a playback mode;
(C) a tape feedback switch movable between a non-operative position and:
  (1) a first operative position which places said recorder in a fast forward mode;
  (2) a second operative position which places said recorder in a non-locked rewind mode; and
  (3) a third operative position which places said recorder in a locked rewind mode;

(D) means for preventing said tape feedback switch from being placed in its third operative position when said playback actuating lever is in its operative position, said means comprising a surface formed in said tape feedback switch which abuts a portion of said playback actuating lever when said playback actuating lever is in its operative position, said surface abutting said playback actuating lever in such a manner that said tape feedback switch may not be placed into its third operative position when said playback actuating lever is in its operative position.

7. A tape recorder, comprising:
(A) a record actuating lever movable between a non-operative position and an operative position which places said recorder in a record mode;
(B) a playback actuating lever movable between a non-operative position and an operative position which places said recorder in a playback mode;
(C) a tape feedback switch movable between a non-operative position and:
  (1) a first operative position which places said recorder in a fast forward mode;
  (2) a second operative position which places said recorder in a non-locked rewind mode; and
  (3) a third operative position which places said recorder in a locked rewind mode;
(D) means for preventing said tape feedback switch from being placed in any of its operative positions when said recorder record actuating lever is in its operative position, said means comprising a surface formed in said tape feedback switch which abuts a portion of said record actuating lever when said record actuating lever is in its operative position, said surface abutting said record actuating lever in such a manner that said tape feedback switch may not be placed into any of its operative positions.

8. A tape recorder, comprising:
(A) a record actuating lever movable between a non-operative position and an operative position which places said recorder in a playback mode;
(B) a playback actuating lever movable between a non-operative position and an operative position which places said recorder in a playback mode;
(C) a tape feedback switch movable between a non-operative position and:
  (1) a first operative position which places said recorder in a fast forward mode;
  (2) a second operative position which places said recorder in a non-locked rewind mode; and
  (3) a third operative position which places said recorder in a locked rewind mode;
(D) means for moving said tape feedback switch out of its third operative position into its non-operative position responsive to movement of said record actuating lever into its operating position and also responsive to movement of said playback actuating lever into its operative position;
(E) means for preventing said tape feed switch from being placed in any of its operative positions when said record actuating lever is in its operative position;
(F) means for preventing said tape feedback switch from being placed in its third operative position when said playback actuating lever is in its operative position; and
(G) a braking member including a brake shoe on one end thereof, said braking member being displaceably disposed adjacent a tape supply shaft and biased to bring said brake shoe into abutment against said tape supply shaft to brake it, said braking member being responsive to actuation of one of said record actuating lever, said rapid tape advance actuating lever and said tape rewind actuating lever to be displaced in a direction to release the brake action on said tape supply shaft.

9. A tape recorder, comprising:
(A) a record actuating lever movable between a non-operative position and an operative position which places said recorder in a playback mode;
(B) a playback actuating lever movable between a non-operative position and an operative position which places said recorder in a playback mode;
(C) a tape feedback switch movable between a non-operative position and:
  (1) a first operative position which places said recorder in a fast forward mode;
  (2) a second operative position which places said recorder in a non-locked rewind mode; and
  (3) a third operative position which places said recorder in a locked rewind mode;
(D) means for moving said tape feedback switch out of its third operative position into its non-operative position responsive to movement of said record actuating lever into its operating position and also responsive to movement of said playback actuating lever into its operative position;
(E) means for preventing said tape feed switch from being placed in any of its operative positions when said record actuating lever is in its operative position;
(F) means for preventing said tape feedback switch from being placed in its third operative position when said playback actuating lever is in its operative position;
(G) a tape cassette ejector which comprises an eject button mounting member slidably mounted on a stationary support of said tape recorder and biased to move upwardly to a given position, said mounting member integrally carrying an eject button which may be depressed to lower said mounting member to a given position;
(H) a cover opening member rockably mounted on said support and having an arm with a pusher which is located opposite to a cover of a cassette receiving chamber of said tape recorder and another arm operatively connected with said eject button mounting member;
(I) an ejecting member rockably mounted on said support and having an arm with a cassette pusher which extends to a position below the bottom of said tape cassette as loaded and another arm extending into the path of movement of said ejection button mounting member for cooperation therewith; and
(J) a locking member on either one of said arms of said ejecting member and adapted to be engaged by a magnetic head support lever when it is in its operative position to thereby disable the operation of said ejecting member whereby only said cover opening member is operable during an operation of said taper recorder to open said cover of said cassette receiving chamber, depression of said eject button being enabled during the time when said tape recorder is inoperative, to operate said cover opening member initially to open said cover of said cassette receiving chamber and to operate said ejecting member sequentially to eject a tape cassette.

10. A tape recorder, comprising:
(A) a record actuating lever movable between a non-operative position and an operative position which places said recorder in a playback mode;
(B) a playback actuating lever movable between a non-operative position and an operative position which places said recorder in a playback mode;
(C) a tape feedback switch movable between a non-operative position and:
   (1) a first operative position which places said recorder in a fast forward mode;
   (2) a second operative position which places said recorder in a non-locked rewind mode; and
   (3) a third operative position which places said recorder in a locked rewind mode;
(D) means for moving said tape feedback switch out of its third operative position into its non-operative position responsive to movement of said record actuating lever into its operative position and also responsive to movement of said playback actuating lever into its operative position, said means for moving said tape feedback switch out of its third position into its non-operative position comprising:
   (1) a first surface formed in said tape feedback switch, the location and shape of said first surface being arranged such that said record actuating lever contacts said first surface and urges said tape feedback switch out of its third operative position when said record actuating lever is moved into its operative position; and
   (2) a second surface formed in said tape feedback switch, the location and shape of said second surface being arranged such that said playback actuating lever contacts said second surface and urges said tape feedback switch out of its third operative position when said playback actuating lever is moved into its operative position; and
(E) means for preventing said tape feed switch from being placed in any of its operative positions when said record actuating lever is in its operative position; and
(F) means for preventing said tape feedback switch from being placed in its third operative position when said playback actuating lever is in its operative position.

11. The tape recorder of claim 10 wherein said means for preventing said tape feedback switch from being placed in any of its operative positions comprises a third surface formed in said tape feedback switch which abuts a portion of said record actuating lever when said record actuating lever is in its operative position, said third surface abutting said record actuating lever in such a manner that said tape feedback switch may not be moved into any of its operative positions.

12. The tape recorder of claim 11, wherein said means for preventing said tape feedback switch from being placed in its third operative position comprises a fourth surface formed in said tape feedback switch which abuts a portion of said playback actuating lever when said playback actuating lever is in its operative position, said fourth surface abutting said playback actuating lever in such a manner that said tape feed switch may not be placed into its third operative position when said playback actuating lever is in its operative position.

* * * * *